(12) United States Patent
Sohara et al.

(10) Patent No.: US 10,053,370 B2
(45) Date of Patent: Aug. 21, 2018

(54) LIME CAUSTICIZATION PRODUCT BRIGHTNESS IMPROVEMENT VIA PRE-SLAKING

(75) Inventors: Joseph A. Sohara, Northampton, PA (US); Keith Hanchett, Emmaus, PA (US); David Peters, Bethlehem, PA (US)

(73) Assignee: SPECIALTY MINERALS (MICHIGAN) INC., Bingham Farms, MI (US)

( * ) Notice: Subject to any disclaimer, the term of this patent is extended or adjusted under 35 U.S.C. 154(b) by 702 days.

(21) Appl. No.: 13/812,930

(22) PCT Filed: Aug. 19, 2011

(86) PCT No.: PCT/US2011/048426
§ 371 (c)(1),
(2), (4) Date: Jan. 29, 2013

(87) PCT Pub. No.: WO2012/027223
PCT Pub. Date: Mar. 1, 2012

(65) Prior Publication Data
US 2013/0129601 A1    May 23, 2013

Related U.S. Application Data

(60) Provisional application No. 61/376,440, filed on Aug. 24, 2010.

(51) Int. Cl.
*D21C 11/00* (2006.01)
*C01F 11/18* (2006.01)

(52) U.S. Cl.
CPC ........... *C01F 11/181* (2013.01); *C01F 11/18* (2013.01); *D21C 11/0064* (2013.01);
(Continued)

(58) Field of Classification Search
None
See application file for complete search history.

(56) References Cited

U.S. PATENT DOCUMENTS

| 3,268,388 A | 8/1966 | Bauman et al. |
| 4,762,590 A | 8/1988 | Engciahl |
| | (Continued) | |

FOREIGN PATENT DOCUMENTS

| CN | 101113033 A | 1/2008 |
| EP | 0125163 A1 | 11/1984 |
| | (Continued) | |

OTHER PUBLICATIONS

Supplementary European Search Report for Counterpart EP Application No. 11820430.4.

*Primary Examiner* — Daniel Berns
(74) *Attorney, Agent, or Firm* — Squire Patton Boggs (US) LLP

(57) ABSTRACT

A method for obtaining particulate calcium carbonate exhibiting improved brightness and color and having uniformity of size such that when the particles are formed in the causticization process in a kraft pulp mill, the time required to separate the particles from liquors in which they are suspended is minimized and the amount of liquor recovered is maximized, with minimal dilution by water used for washing. The method includes the steps of a) slaking calcium oxide in water or an alkaline liquor containing as dissolved species predominantly sodium hydroxide; b) mixing the slaked lime with green liquor from a kraft pulping process to complete a causticization reaction that produces white liquor and lime mud; c) separating the lime mud from the white liquor; and d) milling a portion of the lime mud for use as a white mineral pigment in applications where such pigments are typically used.

7 Claims, 13 Drawing Sheets

(52) U.S. Cl.
CPC ...... *C01P 2004/51* (2013.01); *C01P 2004/61* (2013.01); *C01P 2006/12* (2013.01); *C01P 2006/60* (2013.01); *Y02P 40/44* (2015.11)

(56) References Cited

U.S. PATENT DOCUMENTS

| | | | | |
|---|---|---|---|---|
| 2004/0084373 | A1* | 5/2004 | Wilson | B01D 61/16 210/651 |
| 2005/0079117 | A1 | 4/2005 | Takahashi | |
| 2005/0199358 | A1* | 9/2005 | Ai | C01D 1/20 162/29 |
| 2008/0053337 | A1* | 3/2008 | Sohara et al. | 106/464 |

FOREIGN PATENT DOCUMENTS

| | | |
|---|---|---|
| EP | 0902123 A2 | 3/1999 |
| JP | 2002-284522 A | 10/2002 |
| JP | 2004-026639 A | 1/2004 |

\* cited by examiner

SODIUM AND CALCIUM LOOPS IN A KRAFT PULP MILL

KRAFT CAUSTICIZATION OF GREEN LIQUOR

KRAFT CAUSTICIZATION OF GREEN LIQUOR ACCORDING TO A SECOND EMBODIMENT OF THE INVENTION

KRAFT CAUSTICIZATION OF GREEN LIQUOR ACCORDING TO A FOURTH EMBODIMENT OF THE INVENTION

KRAFT CAUSTICIZATION OF GREEN LIQUOR ACCORDING TO A SIXTH EMBODIMENT OF THE INVENTION

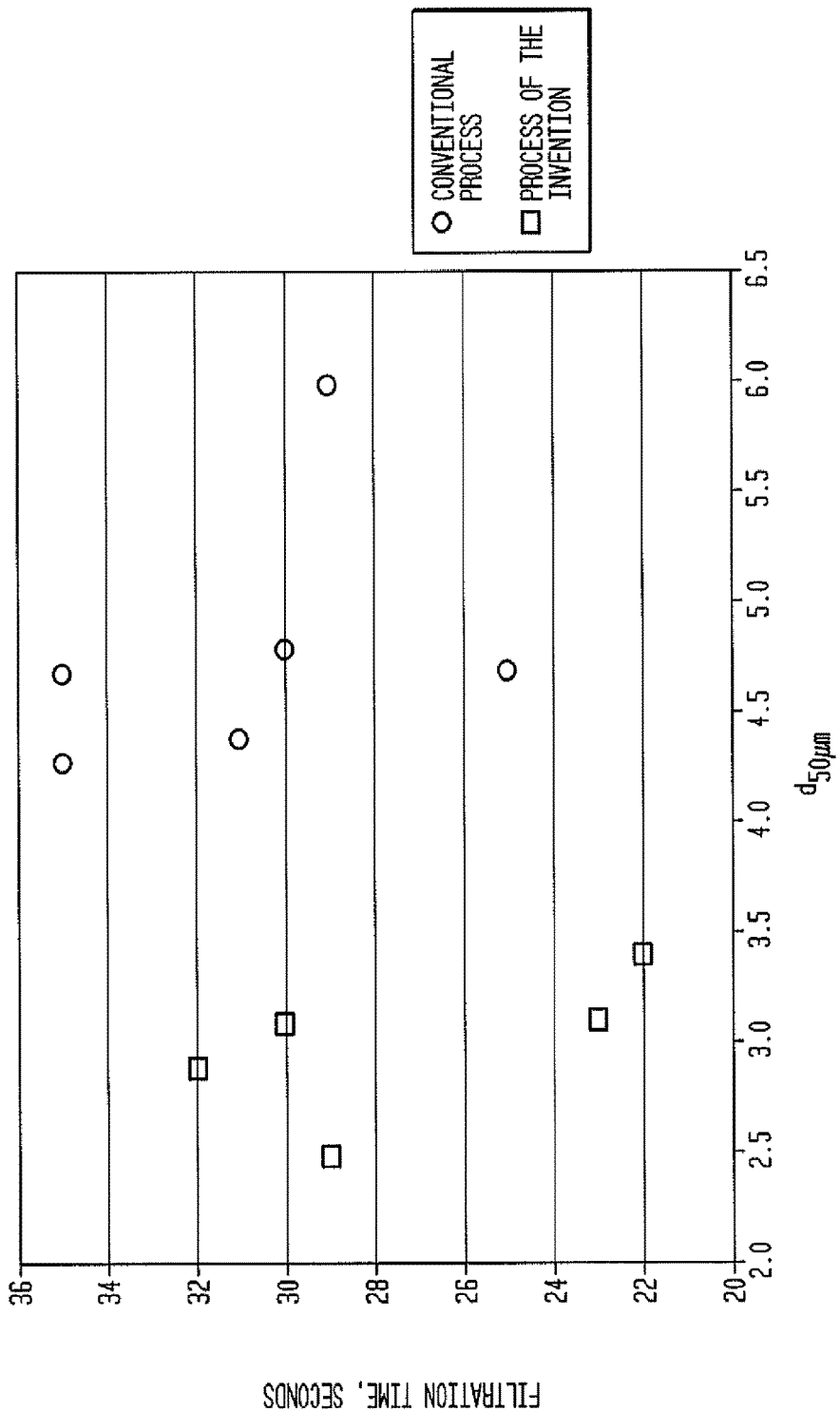

LIME CAUSTICIZATION PRODUCT BRIGHTNESS IMPROVEMENT VIA PRE-SLAKING

CROSS REFERENCE TO RELATED APPLICATIONS

This application is a 35 U.S.C. § 371 national stage application of International application number PCT/US2011/048426, filed on 19 Aug. 2011, and published as WO 2012/027223 A1 on 1 Mar. 2012, which claims the benefit of U.S. provisional patent application No. 61/376,440, filed on 24 Aug. 2010.

BACKGROUND OF THE INVENTION

1. Field of the Invention

The present invention relates in general to methods for obtaining particulate calcium carbonate, and more particularly to methods for obtaining particulate calcium carbonate having uniformity of size such that when the particles are formed in the causticization process in a kraft pulp mill, the time required to separate the particles from liquors in which they are suspended is minimized and the amount of liquor recovered is maximized, with minimal dilution by water used for washing. Such uniformity of size also tends to improve the brightness and color of the particulate calcium carbonate.

2. Background of the Art

The kraft process, also known as the sulfate process, for extracting cellulose pulp from wood is practiced throughout the world. In many mills, the process is done in a sequential, closed loop that includes recovery of the spent chemicals. There are three (3) main operations in kraft pulping, and these are shown in FIG. 1.
  a. Pulping, in which wood chips are cooked in a chemical solution, called white liquor, that consists primarily of caustic soda (NaOH) and sodium sulfide ($Na_2S$).
  b. Black Liquor Evaporation & Combustion, in which water is first removed from the spent cooking liquor followed by combustion to produce energy and recover non-combustible inorganic chemicals. The chemicals are recovered in a molten state, called a smelt, and dissolved in a dilute aqueous solution called weak wash that is produced in another part of the process. The dissolved smelt is called green liquor. The primary species in green liquor are sodium carbonate ($Na_2CO_3$), sodium sulfide ($Na_2S$) and sodium hydroxide (NaOH). The characteristic color of green liquor is due primarily to the presence of insoluble organic and inorganic sulfides, which are compounds containing sulfur in a chemically reduced state.
  c. Causticization (sometimes called re-causticization), is a process where green liquor is combined with, or causticized, with lime (CaO). Causticization regenerates white liquor, along with particulate calcium carbonate, called lime mud. The lime mud is discharged to a landfill or fed to a mud kiln to where it is calcined to re-generate lime for causticization.

The causticization reactions can be written

$$CaO + H_2O \rightarrow Ca(OH)_2 \quad (1)$$

$$Ca(OH)_2 + Na_2CO_3 \rightarrow 2NaOH + CaCO_3 \quad (2)$$

Note that in Equation (2), sodium is being exchanged with calcium. This is observed in FIG. 1, where the two process loops depicted are labeled the Sodium Loop and the Calcium Loop, and the intersection of the loops occurs in the causticization step. Maximum chemical efficiency and minimal material losses occur when sodium and calcium are contained as completely as possible within their respective loops, with as little exchange as possible of either element (Na or Ca) into the opposing loop. Note also that sodium sulfide ($Na_2S$), which is necessary to the pulp cooking process, does not participate in the causticization reaction, but is simply transferred from green liquor to white liquor as the causticization reaction proceeds.

In conventional kraft pulping, causticization is done by continuously feeding a stream of dry calcium oxide powder into a slaker into which is simultaneously and continuously fed a stream of green liquor. Under such conditions, Reactions 1 and 2 occur in quick succession, beginning in the slaking vessel and continuing over a period of hours as the reaction mixture is fed to a series of causticization tanks. The residence time in the causticization tanks is determined by the flow rates and is set such that the reaction is essentially complete when the mixture exits the last tank in the series. Multiple stirred tanks fed by gravity flow typically are used, and this ensures good mixing of the reactants throughout the process. By carrying out Reactions 1 and 2 via a single-step addition, large, highly agglomerated particles are formed which are easily separated from the white liquor that is co-produced.

Surprisingly, it has been found that by carrying out the reactions defined by Equation 1 and 2 in separate steps, an improved uniformity of size of the lime mud particles is achieved. The degree of agglomeration is correspondingly reduced as well, while maintaining ease of separation of lime mud from white liquor. Even more surprisingly, although the average size of the lime mud particles may be reduced in the process of the current invention (i.e., the particles may, on average, become smaller) the improved particle uniformly and reduced agglomeration result in an increase in the rate of separation of the particles from the white liquor. Along with these benefits, brightness and color of the lime mud particles are improved as well.

The process of the current invention thus produces a brighter, more uniform material that is more suited to applications in which white minerals are typically used. Greater uniformity of particles requires less energy, for example, when milling is used to reduce the size of the particles for those applications that require it.

A kraft causticization process that does not employ a mud kiln is depicted in FIG. 2. In FIG. 2, lime (CaO) that is purchased and stored in a silo is fed to a slaker where it is combined with a stoichiometric excess of filtered green liquor. The mixture from the slaker is fed sequentially to a series of causticization tanks that are filled by gravity overflow. The tanks provide sufficient residence time for the reaction between lime and green liquor to proceed as nearly to completion as possible.

The slurry from the causticization tanks is fed to a filter where the white liquor and lime mud are separated. The time required for filtration and the efficiency of separation are determined largely by the size and size distribution of the lime mud particles. It is generally desirable that the particles be of sufficiently large size to provide fast and substantially complete separation from the white liquor.

Following separation from the white liquor, the concentrated lime mud is fed to a mud wash filter where it is washed with water to remove white liquor that remains trapped in the filter cake. Again, it is generally desirable that the particles are sufficiently large and distributed over a narrow range of sizes so as to minimize the amount of water consumed in washing. The diluted white liquor, or weak wash, recovered during this step is returned to the black liquor recovery boiler where it is used to dissolve smelt to form green liquor.

The washed lime mud can be treated by passing a stream of vaporized carbon dioxide ($CO_2$) through the lime mud to convert any remaining sodium hydroxide (NaOH) to sodium carbonate/sodium bicarbonate ($Na_2CO_3$/$NaHCO_3$) thus rendering the pH of the mud sufficiently low as to be safely discharged to landfill. FIGS. 1 and 2 serve to illustrate several operational issues that can reduce the overall efficiency of the recovery process or create problems in disposing of the lime mud, either in a landfill or by calcination in a mud kiln.

First, incomplete separation of sodium compounds can occur when lime mud is separated from white liquor following causticization. Material loss of sodium from the sodium loop represents a cost, as any lost sodium must be replaced. FIG. 1 shows that makeup chemicals are often added to the black liquor recovery boiler where they become part of the smelt.

Also, sodium species that remain with the lime mud must either be removed from the mud via washing or remain with the mud. Kraft processes that employ a mud kiln generally operate to obtain a certain desirable level of sodium in the kiln feed, as this aids in the formation of nodular aggregates that are more efficiently calcined than fine powders. However, too much sodium in the mud leads to the formation of kiln rings that slow or stop the transport of material through the kiln. When they occur, kiln rings must be removed, which requires shutdown and cooling of the kiln and represents a significant operational inefficiency. Undesirably high sodium levels in the mud must therefore be reduced by washing, which can lead to high water consumption, which is both economically and environmentally unsound.

Also, lime mud, which is chemically precipitated during the causticization reaction, is highly suited to trapping and entraining so-called non-process elements (NPEs) which are typically the metal sulfides of elements such as iron (Fe), magnesium (Mg), manganese (Mn) and others. In a kraft process employing a mud kiln, NPEs can build up in the system and must be periodically purged from the system by discharging lime mud in order to maintain process efficiency. Such purging results in an increased amount of lime mud being discharged than would otherwise be required and represents an economic penalty.

Also, lime mud is typically light gray to dark gray in color due to the presence of sulfides. In a kraft process that does not employ a mud kiln, dark lime mud caused by sulfides can result in a diminished ability to utilize the lime mud in applications that are generally suited to the use of conventional calcium carbonate particles. Such applications include paper, paints, plastics, agricultural and other uses. Additionally, lime mud that is intended for use in these applications generally must be milled to a target size and/or specific surface area, which requires energy. Therefore it is desirable that the lime mud particles be formed as aggregates, which aids in filtration, but which are easily broken apart.

It is therefore an object of the invention to improve the separation of white liquor from lime mud by controlling the particle size, size distribution and specific surface area of the mud by controlling the conditions under which the causticization process is carried out in a kraft pulp mill.

It is another object of the invention to optimize the recovery of sodium species in the white liquor while minimizing the amount of water required for washing.

It is another object of the invention to maximize the whiteness and brightness of the lime mud produced from the causticization reaction.

It is another object of the invention to optimize the morphology of the lime mud so that it can be more easily milled to a desired final size, thus requiring less milling energy.

It is another object of the invention to reduce the energy consumed by the operation of a mud kiln in kraft processes that employ such a kiln. This is accomplished by reducing the volume of mud that must be fed to the kiln when the lime mud arising from the invention exhibits improved color and brightness and/or shape, and a larger portion of the lime mud can be used as a pigment in applications where such pigments are typically employed.

BRIEF DESCRIPTION OF THE DRAWINGS

FIG. 13 is a graph showing the correlation between filtration time and size of particulate calcium carbonate of the present invention and from a typical kraft pulp mill.

DESCRIPTION OF THE INVENTION

The present invention comprises a method of obtaining particulate calcium carbonate from the causticization process in a kraft pulp mill. The method comprises the steps of a) slaking calcium oxide (CaO, lime) in water or an alkaline liquor containing as dissolved species predominantly sodium hydroxide; b) mixing the slaked lime with green liquor from a kraft pulping process to complete a causticization reaction that produces white liquor and lime mud; c) separating the lime mud from the white liquor; and d) milling a portion of the lime mud for use as a white mineral pigment in applications where such pigments are typically used.

In one embodiment of the present invention, the calcium oxide of step a) is first slaked in water to form milk of lime. The milk of lime is then fed into a reactor containing kraft mill green liquor to complete a causticization reaction that produces white liquor and lime mud. The lime mud and white liquor are separated, and the mud is washed with water before a portion of the lime mud is milled for use as a white mineral pigment in applications where such pigments are typically used. The washed lime mud can be treated at treatment means 170 by passing a stream of vaporized carbon dioxide ($CO_2$) through the lime mud to convert any remaining sodium hydroxide (NaOH) to sodium carbonate/sodium bicarbonate ($Na_2CO_3/NaHCO_3$).

Figure 1:
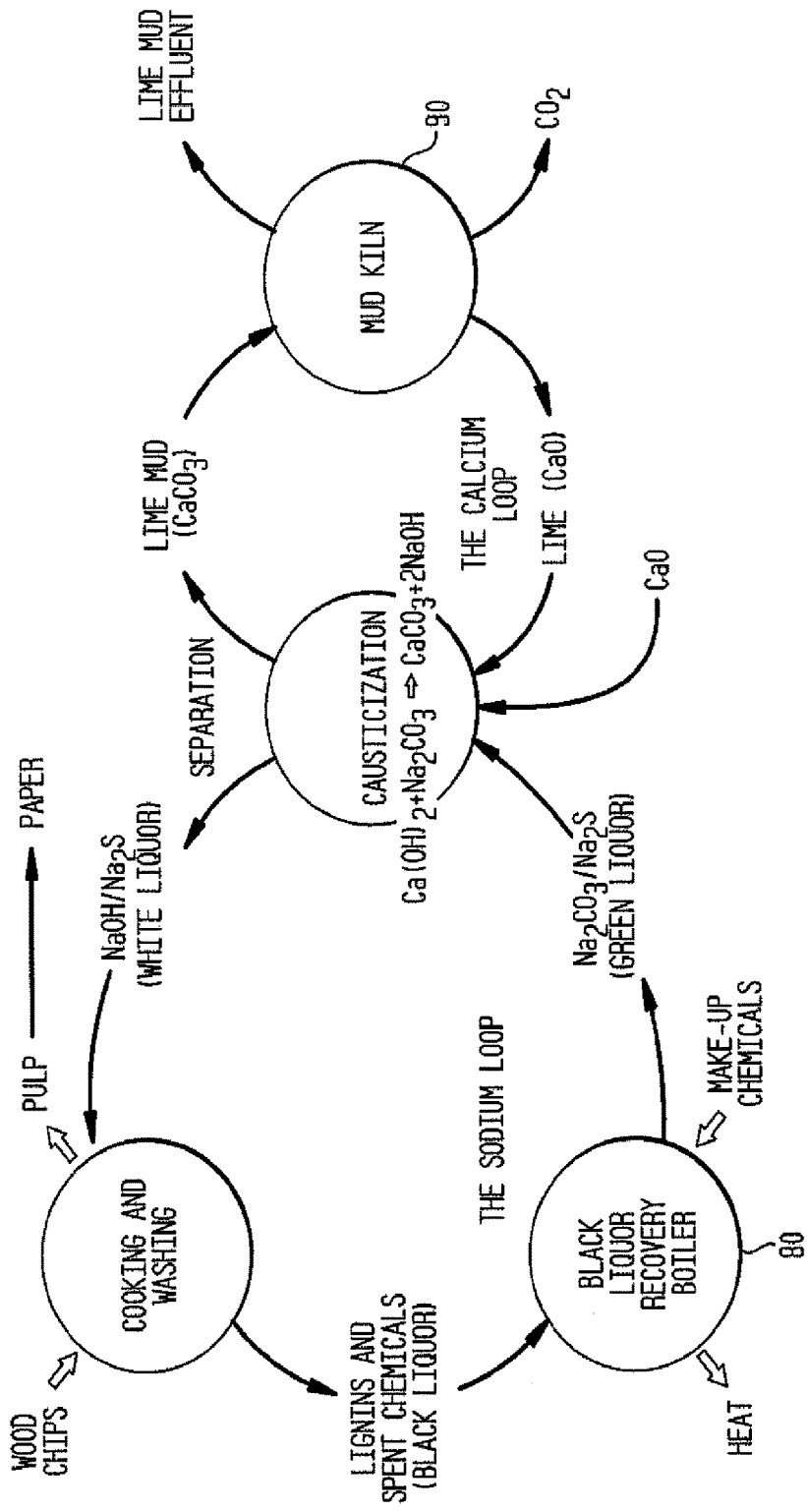
FIG. 1 is a diagrammatic representation of the pulping, black liquor evaporation and causticization processes.
Figure 2:
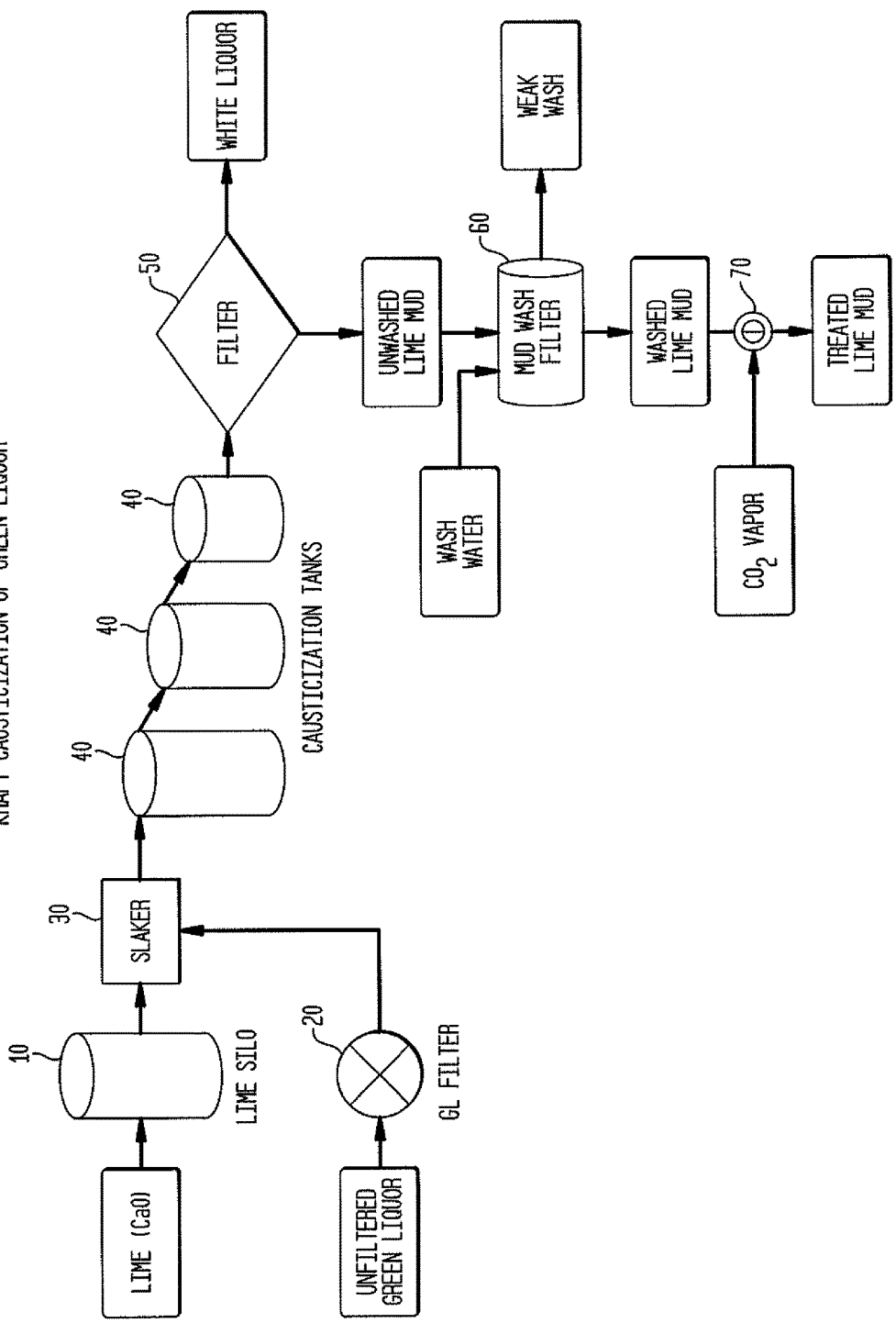
FIG. 2 is a diagrammatic representation of the kraft causticization processes in a mill that does not use a mud kiln.
Figure 3:
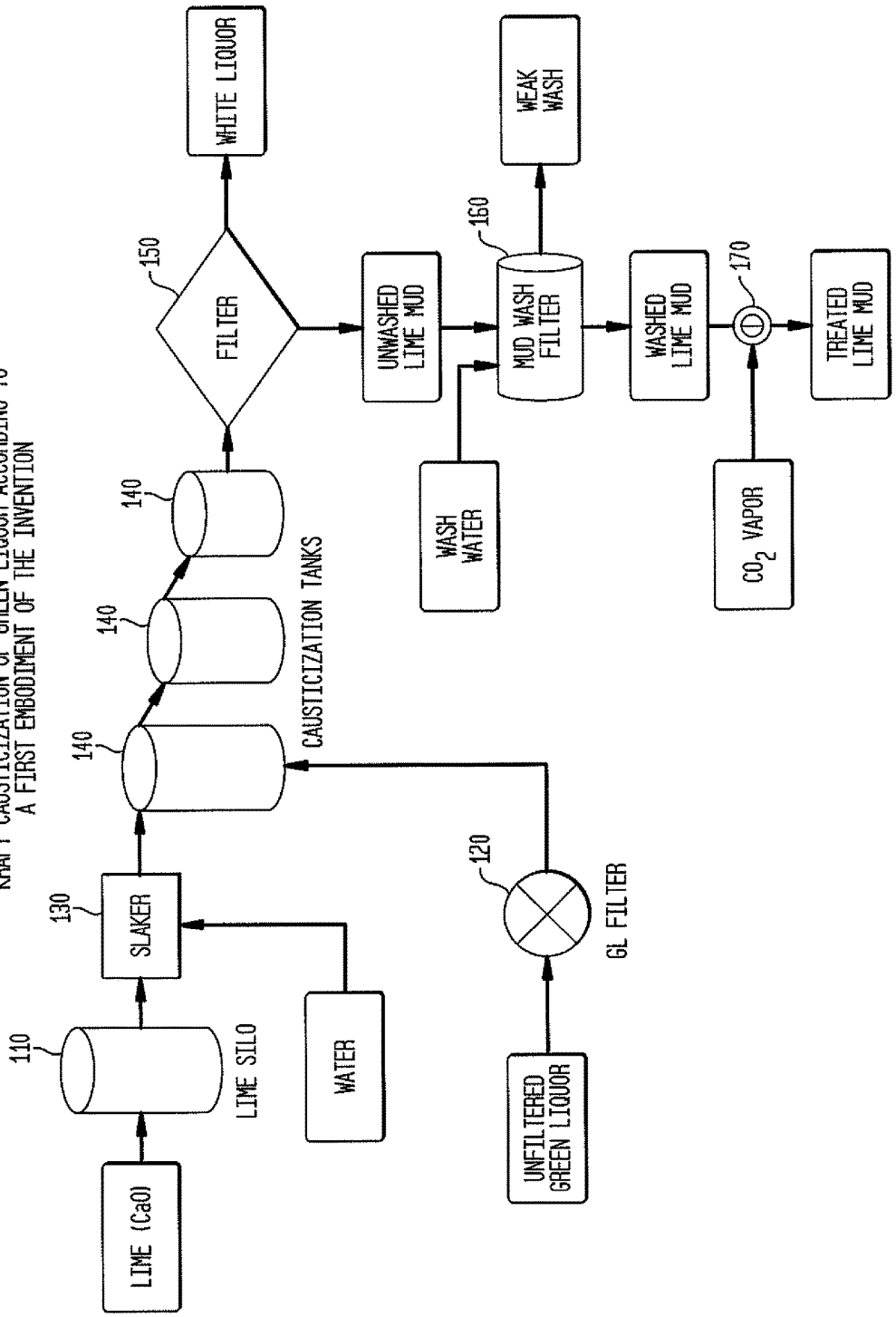
FIG. 3 is a diagrammatic representation of the kraft causticization of green liquor according to a first embodiment of the present invention.
Figure 4:
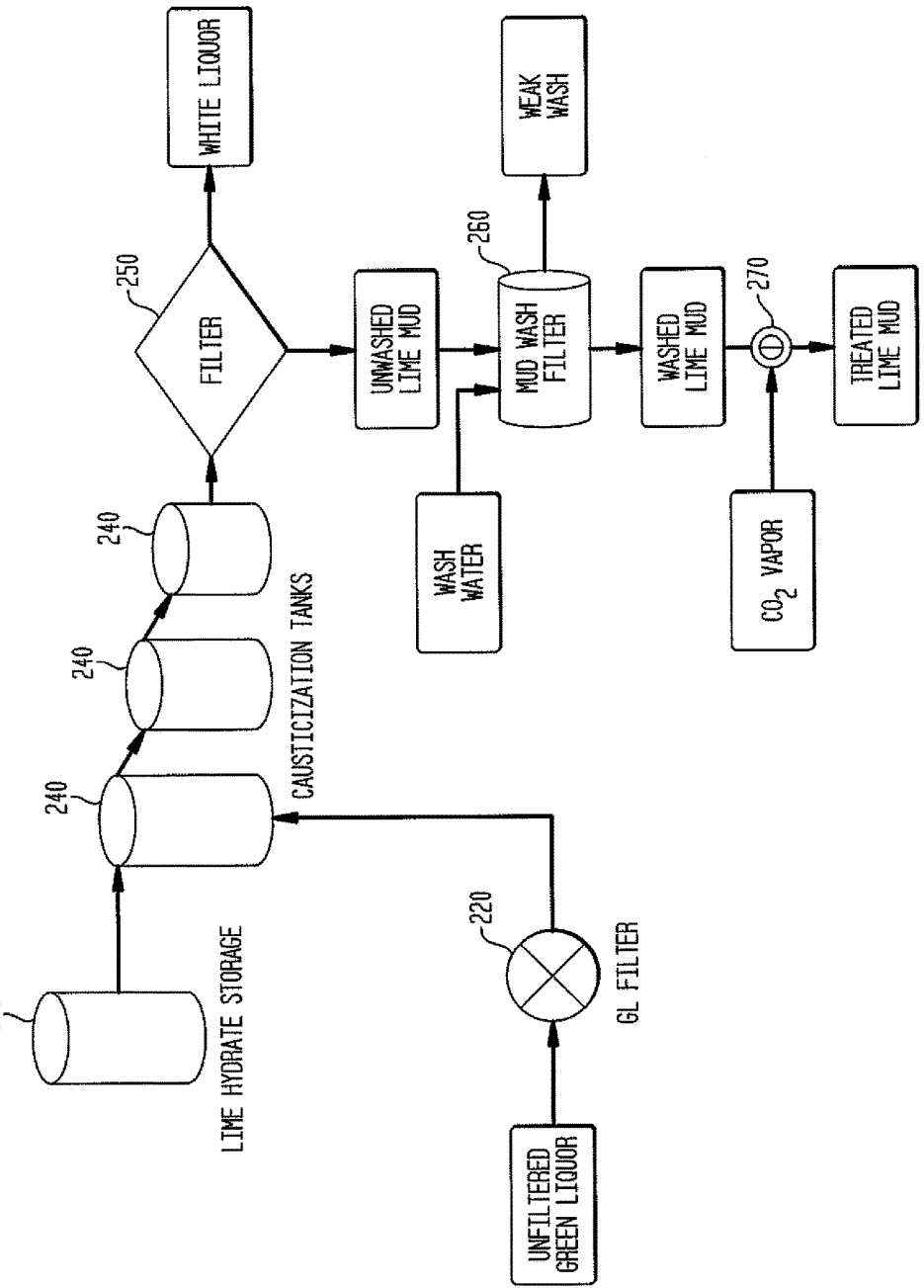
FIG. 4 is a diagrammatic representation of the kraft causticization of green liquor according to a second embodiment of the present invention.

In one embodiment of the present invention, shown in FIG. 3, the calcium oxide of step a) is first slaked in water to form milk of lime. The milk of lime is then fed into a reactor containing kraft mill green liquor to complete a causticization reaction that produces white liquor and lime mud. The lime mud and white liquor are separated, and the mud is washed with water before a portion of the lime mud is milled for use as a white mineral pigment in applications where such pigments are typically used. The washed lime mud can be treated at treatment means 170 by passing a stream of vaporized carbon dioxide ($CO_2$) through the lime mud to convert any remaining sodium hydroxide (NaOH) to sodium carbonate/sodium bicarbonate ($Na_2CO_3/NaHCO_3$).

Figure 5:
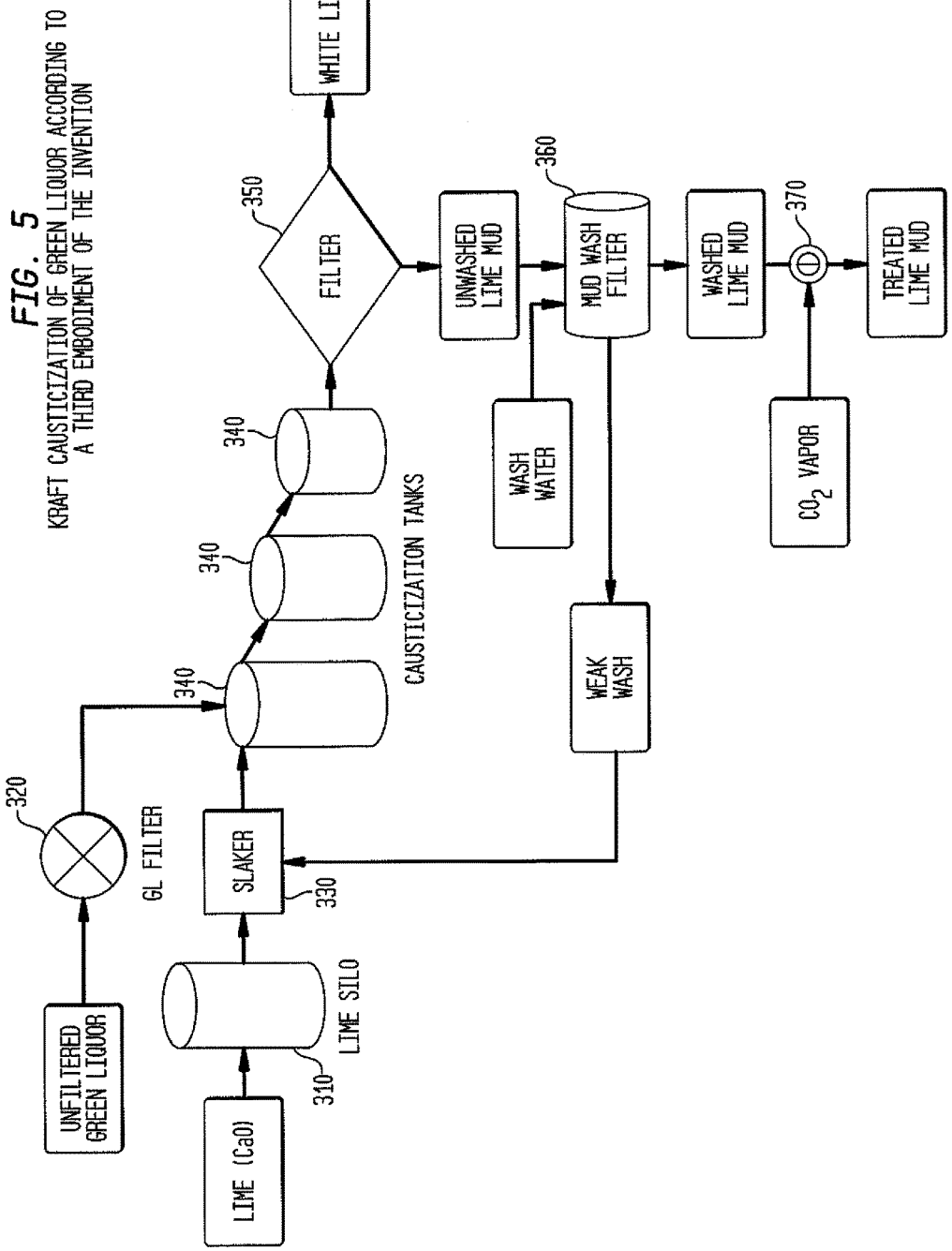
FIG. 5 is a diagrammatic representation of the kraft causticization of green liquor according to a third embodiment of the present invention.

In another embodiment of the present invention as seen in FIG. 5, the calcium oxide which can be stored in lime silo 310 of step a) is slaked at slaker 330 in weak wash generated when lime mud that has been separated such as by filtration by a filtration means, here mud wash filter 360 from white liquor is further washed with water to remove residual white liquor from the mud cake. The slaked lime slurry is then fed into a reactor containing kraft mill green liquor which can be filtered at green liquor filter 320 to complete a causticization reaction that produces white liquor and lime mud. The causticization reaction can occur in causticization tanks 340. The lime mud and white liquor are separated such as by filtration by a filtration means, here filter 350, and the mud is washed at mud wash filter 360 with water before a portion of the lime mud is milled for use as a white mineral pigment in applications where such pigments are typically used. The washed lime mud can be treated at treatment means 370 by passing a stream of vaporized carbon dioxide ($CO_2$) through the lime mud to convert any remaining sodium hydroxide (NaOH) to sodium carbonate/sodium bicarbonate ($Na_2CO_3/NaHCO_3$).

Figure 6:
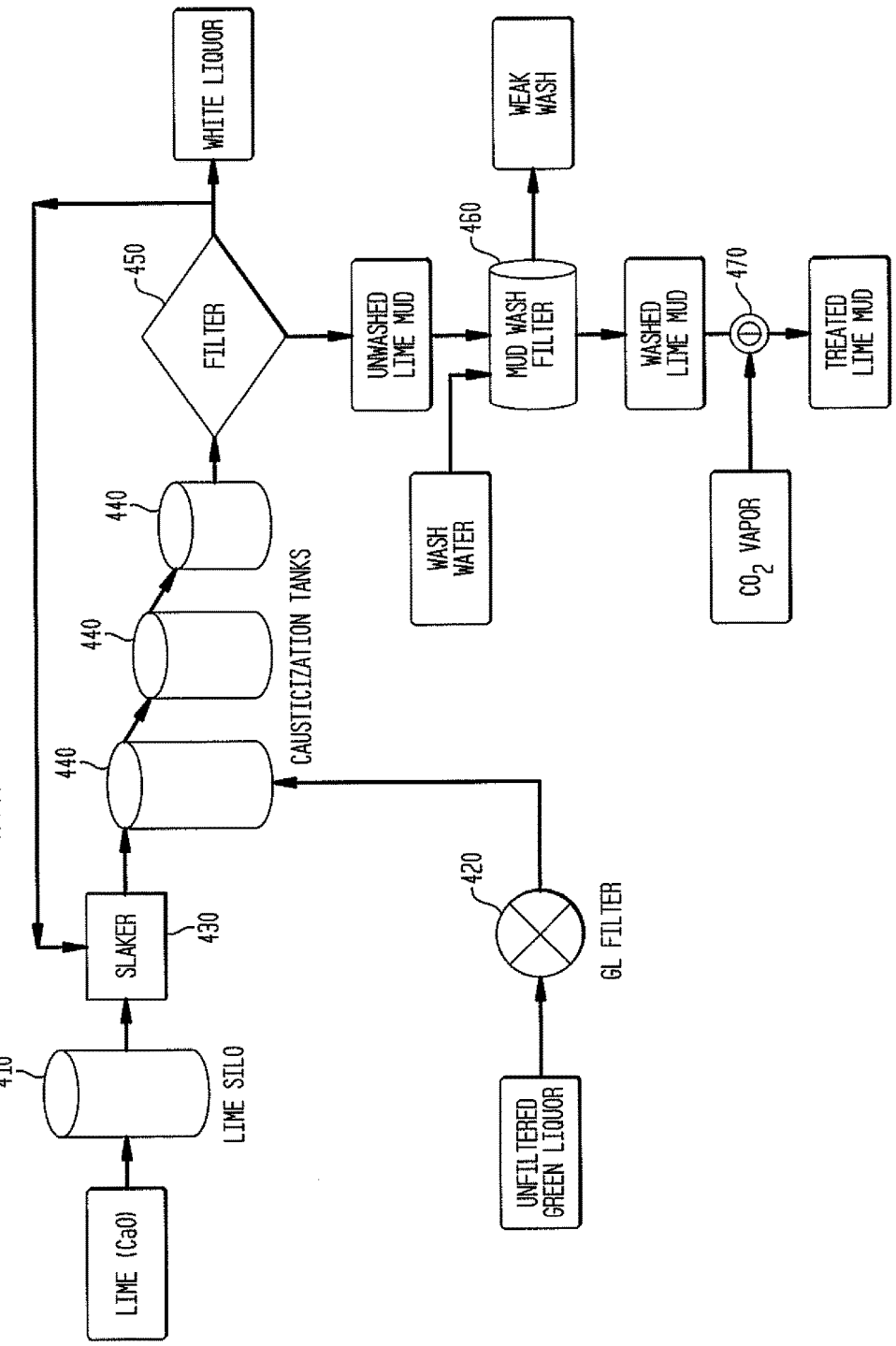
FIG. 6 is a diagrammatic representation of the kraft causticization of green liquor according to a fourth embodiment of the present invention.

In another embodiment of the present invention as seen in FIG. 6, the calcium oxide which can be stored in lime silo 410 of step a) is slaked at slaker 430 in white liquor produced by the causticization reaction of a kraft pulping process.

The slaked lime slurry is then fed into a reactor containing kraft mill green liquor which can be filtered at green liquor filter 420 to complete a causticization reaction that produces white liquor and lime mud. The causticization reaction can occur in causticization tanks 440. The lime mud and white liquor are separated such as by filtration by a filtration means, here filter 450, and the mud is washed at mud wash filter 460 with water before a portion of the lime mud is milled for use as a white mineral pigment in applications where such pigments are typically used. The washed lime mud can be treated at treatment means 470 by passing a stream of vaporized carbon dioxide ($CO_2$) through the lime mud to convert any remaining sodium hydroxide (NaOH) to sodium carbonate/sodium bicarbonate ($Na_2CO_3/NaHCO_3$).

In another embodiment of the present invention, the causticization reaction between kraft green liquor and milk of lime or lime hydrate or alkaline slurry of lime in white liquor or weak wash is done continuously.

In another embodiment of the present invention, the causticization reaction between kraft green liquor and milk of lime or lime hydrate or alkaline slurry of lime in white liquor or weak wash is done in a batch reactor.

Figure 7:
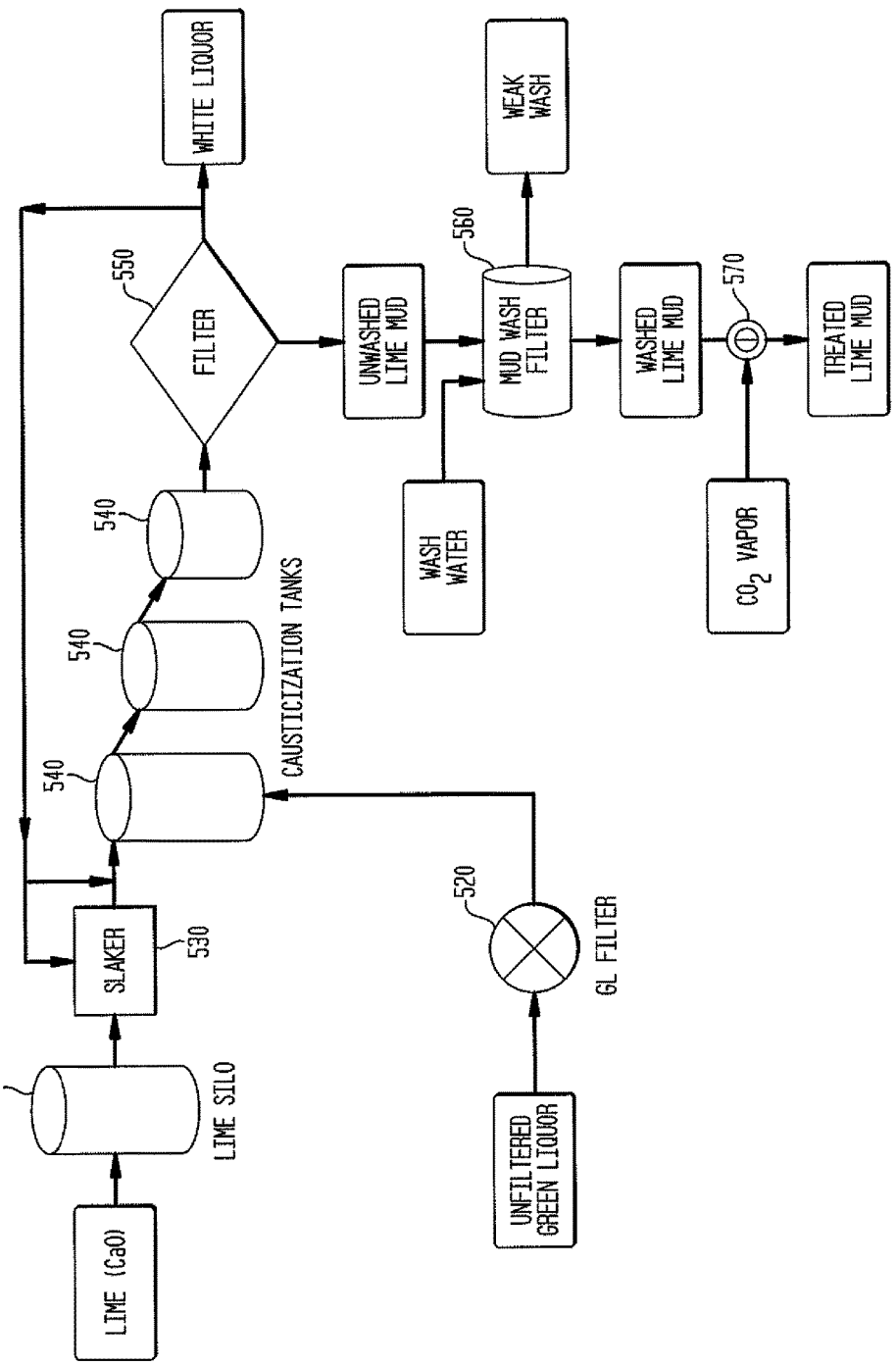
FIG. 7 is a diagrammatic representation of the kraft causticization of green liquor according to a fifth embodiment of the present invention.

In another embodiment of the present invention as seen in FIG. 7, the calcium oxide which can be stored in lime silo 510 of step a) is slaked at slaker 530 in white liquor produced by the causticization reaction of a kraft pulping process. The slaked lime slurry is then fed into a stream or volume of white liquor before being subsequently fed into a reactor containing kraft mill green liquor which can be filtered at green liquor filter 520 to complete a causticization reaction that produces white liquor and lime mud. The causticization reaction can occur in causticization tanks 540. The lime mud and white liquor are separated such as by filtration by a filtration means, here filter 550. A portion of the white liquor from filter 550 can be the white liquor into which slaked lime slurry is fed. The mud is washed at mud wash filter 560 with water before a portion of the lime mud is milled for use as a white mineral pigment in applications where such pigments are typically used. The washed lime mud can be treated at treatment means 570 by passing a stream of vaporized carbon dioxide ($CO_2$) through the lime mud to convert any remaining sodium hydroxide (NaOH) to sodium carbonate/sodium bicarbonate ($Na_2CO_3/NaHCO_3$).

Figure 8:
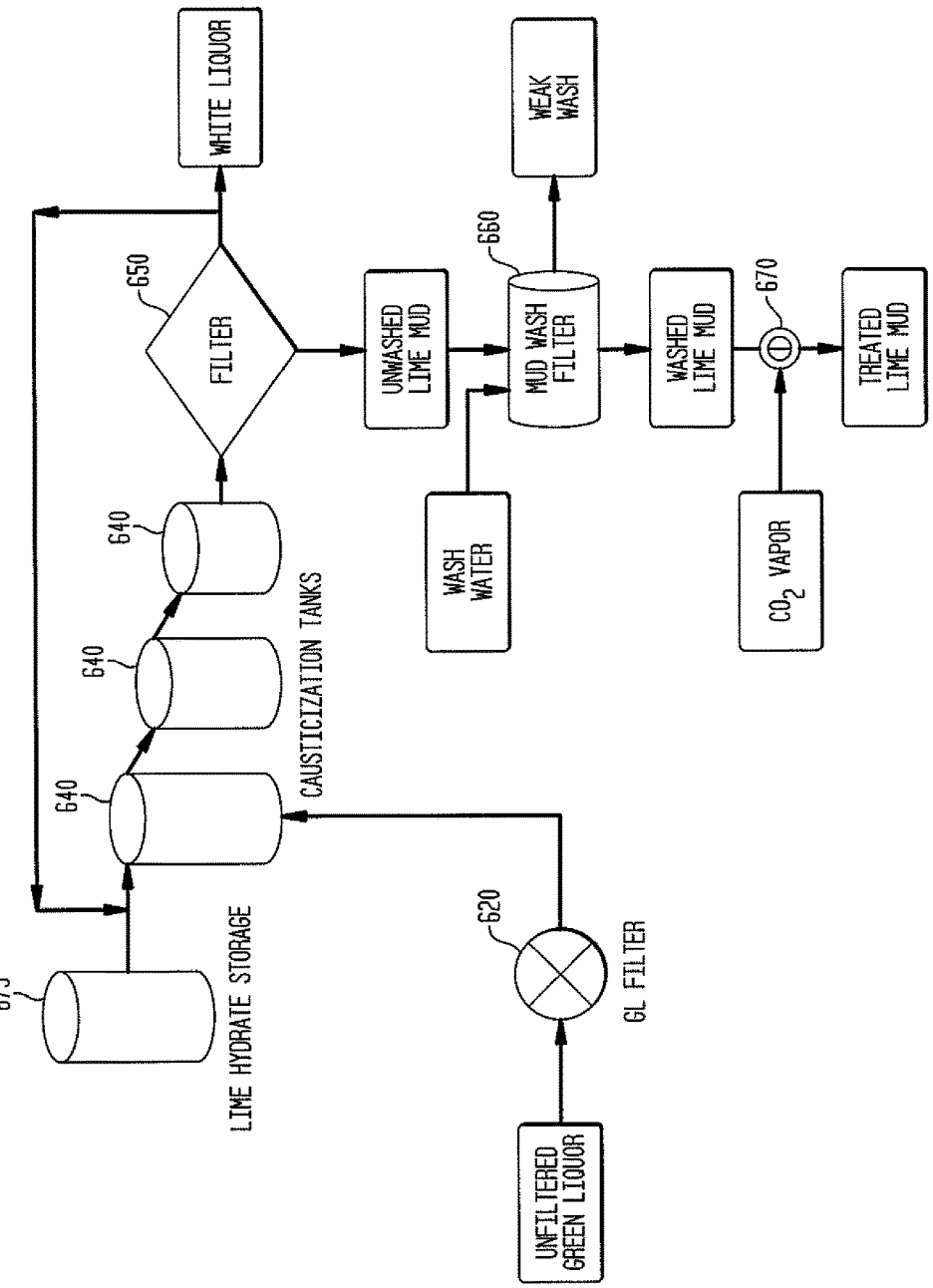
FIG. 8 is a diagrammatic representation of the kraft causticization of green liquor according to a sixth embodiment of the present invention.

In another embodiment of the present invention as seen in FIG. 8, lime hydrate powder which can be stored in lime hydrate storage tank 675 is combined with a stream or volume of white liquor before being subsequently fed into a reactor containing kraft mill green liquor which can be filtered at green liquor filter 620 to complete a causticization reaction that produces white liquor and lime mud. The causticization reaction can occur in causticization tanks 640. The lime mud and white liquor are separated which can occur by means of a filter 650. A portion of the white liquor from filter 650 can be the white liquor into which slaked lime slurry is fed. The mud is washed at mud wash filter 660 with water before a portion of the lime mud is milled for use as a white mineral pigment in applications where such pigments are typically used. The washed lime mud can be treated at treatment means 670 by passing a stream of vaporized carbon dioxide ($CO_2$) through the lime mud to convert any remaining sodium hydroxide (NaOH) to sodium carbonate/sodium bicarbonate ($Na_2CO_3/NaHCO_3$).

Figure 9:
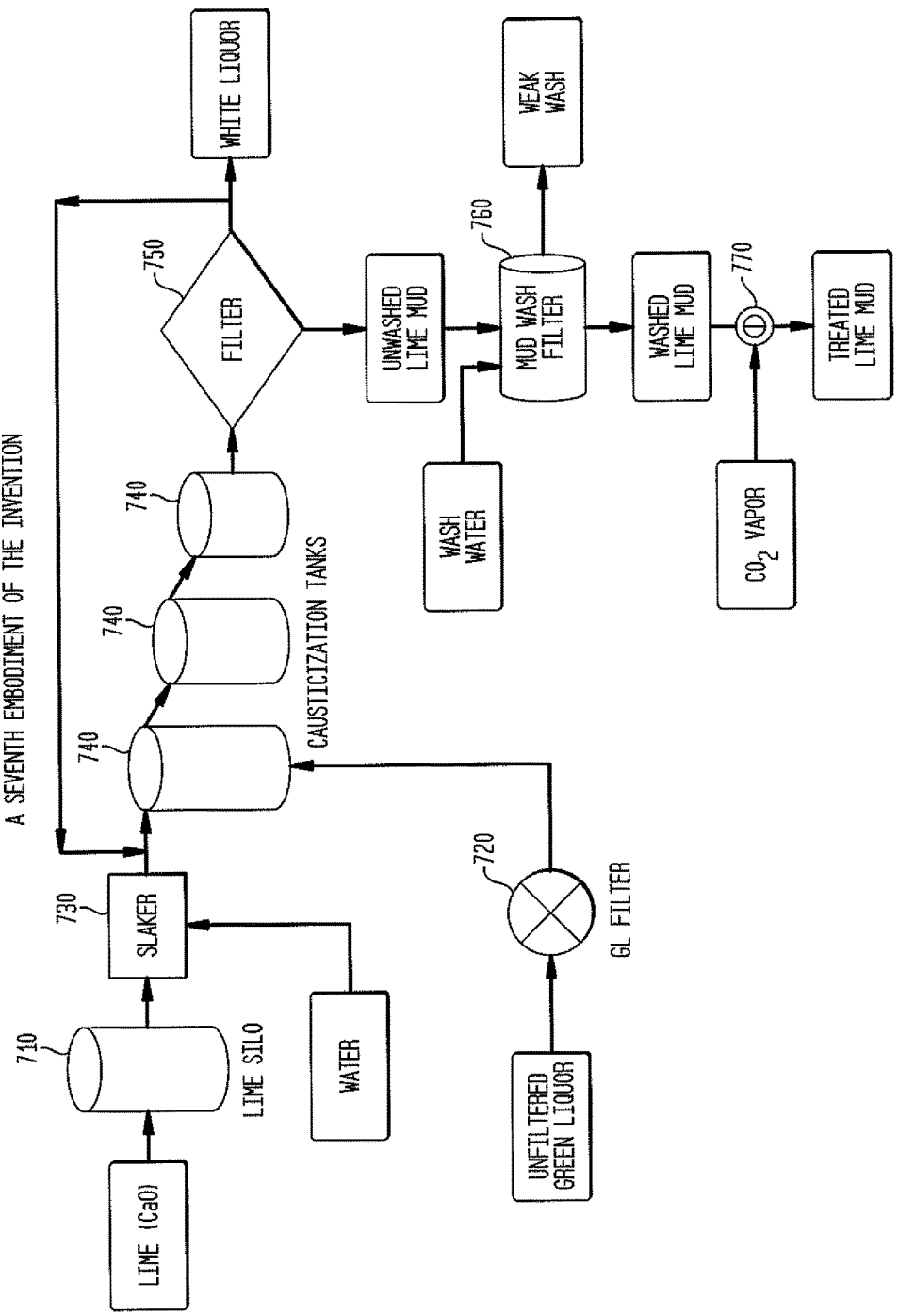
FIG. 9 is a diagrammatic representation of the kraft causticization of green liquor according to a seventh embodiment of the present invention.
Figure 10:
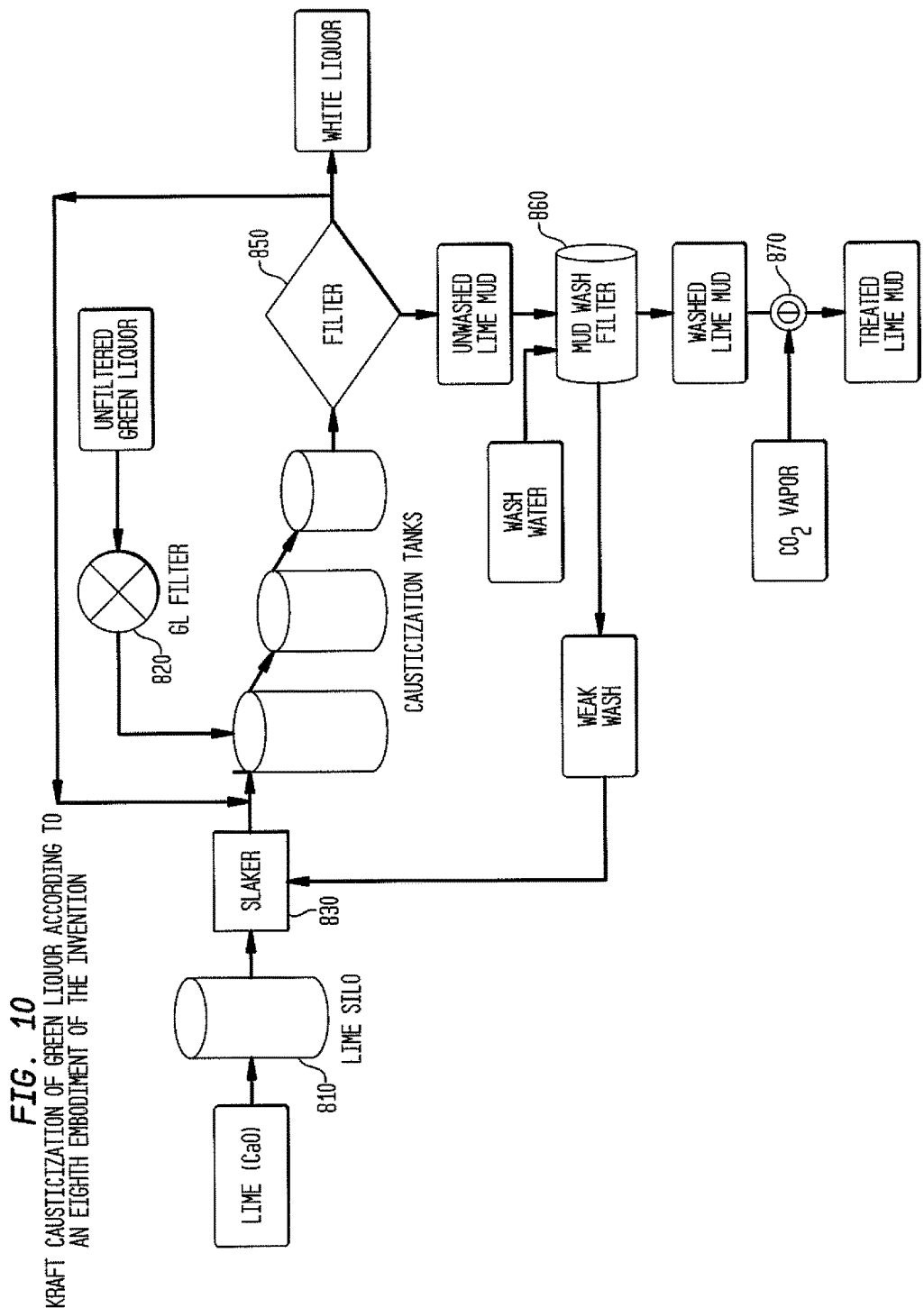
FIG. 10 is a diagrammatic representation of the kraft causticization of green liquor according to an eighth embodiment of the present invention.
Figure 11:
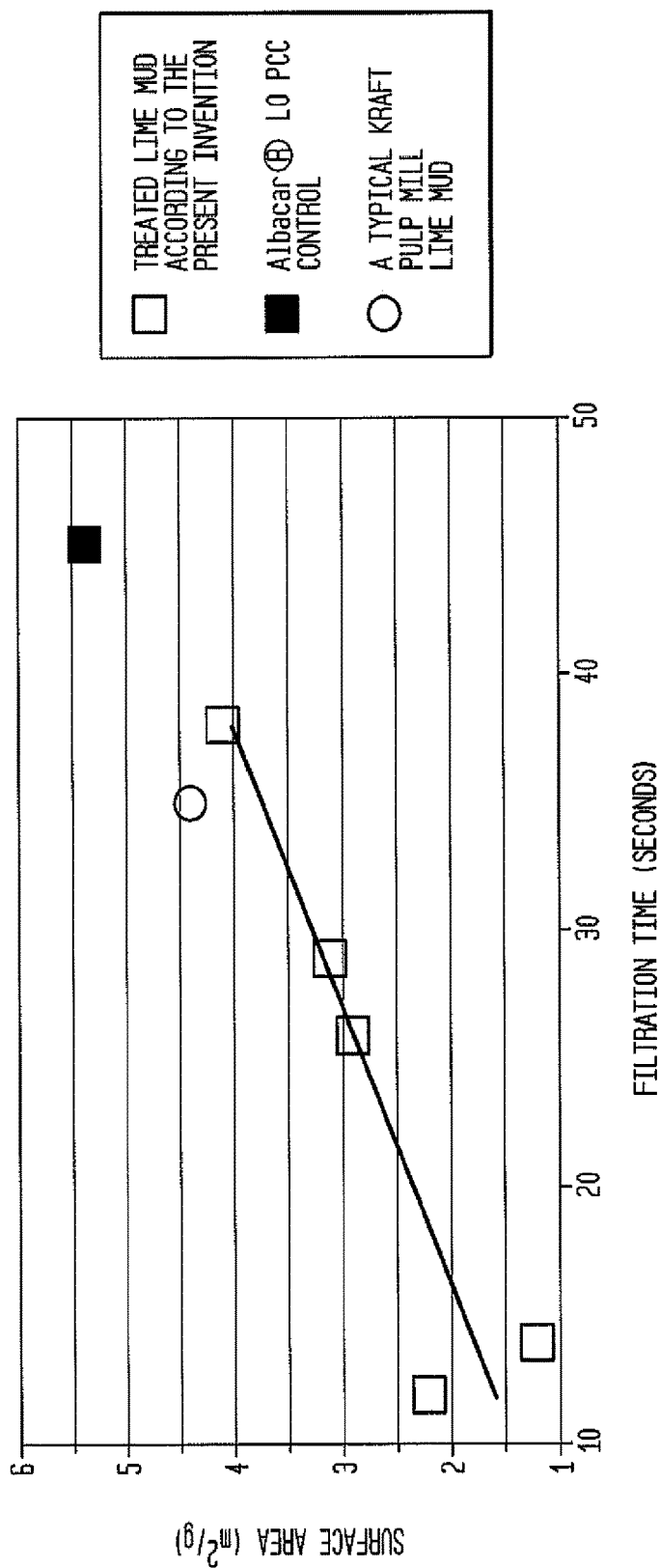
FIG. 11 is an illustration showing the correlation between the surface area and filtration time of a control sample of ALBACAR® precipitated calcium carbonate, treated lime mud of the present invention and lime mud from a typical kraft pulp mill.

In another embodiment of the present invention as seen in FIG. 9, the calcium oxide which can be stored in lime silo 710 of step a) is slaked at slaker 730 in water. The slaked lime is then fed into a stream or volume of white liquor before being subsequently fed into a reactor containing kraft mill green liquor which can be filtered at green liquor filter 720 to complete a causticization reaction that produces white liquor and lime mud. The causticization reaction can occur in causticization tanks 740. The lime mud and white liquor are separated which can occur by means of a filter 750. A portion of the white liquor from filter 750 can be the white liquor into which slaked lime slurry is fed. The mud is washed with water at mud wash filter 760 before a portion of the lime mud is milled for use as a white mineral pigment in applications where such pigments are typically used. The washed lime mud can be treated at treatment means 770 by passing a stream of vaporized carbon dioxide ($CO_2$) through the lime mud to convert any remaining sodium hydroxide (NaOH) to sodium carbonate/sodium bicarbonate ($Na_2CO_3$/ $NaHCO_3$). In another embodiment of the present invention shown in FIG. 10, the calcium oxide which can be stored in lime silo 810 of step a) is slaked at slaker 830 in weak wash generated when lime mud that has been separated at filter 850 from white liquor is further washed with water to remove residual white liquor from the mud cake. The slake is then fed into a stream or volume of white liquor before being subsequently fed into a reactor containing kraft mill green liquor which can be filtered at green liquor filter 820 to complete a causticization reaction that produces white liquor and lime mud. The causticization reaction can occur in causticization tanks 840. The lime mud and white liquor are separated at filter 850. A portion of the white liquor from filter 850 can be the white liquor into which lime slurry which was slaked in weak wash is fed. The mud is washed with water at mud wash filter 860 before a portion of the lime mud is milled for use as a white mineral pigment in applications where such pigments are typically used. The washed lime mud can be treated at treatment means 870 by passing a stream of vaporized carbon dioxide ($CO_2$) through the lime mud to convert any remaining sodium hydroxide (NaOH) to sodium carbonate/sodium bicarbonate ($Na_2CO_3$/ $NaHCO_3$).

EXAMPLES

Example 1

This Example is intended to be a comparative example carried out according to conventional means and not according to the method of the current invention.

To a 4-liter SS reactor were added 1850 ml of kraft green liquor filtered through No. 4 Whatman filter paper and comprised of, as dissolved species, 12.54 wt. % sodium carbonate ($Na_2CO_3$), 2.36 wt. % sodium sulfide ($Na_2S$) and 1.59 wt. % sodium hydroxide (NaOH), and having a specific gravity of 1.21. The contents of the reactor were then heated to 95° C. and held at that temperature by means of a circulating bath containing a 1:1 mixture of ethylene glycol and water. Agitation was accomplished by means of an impeller rotating at 1000 rpm.

100 g of granular lime having an active CaO content of about 95% was added to the reactor over about 15 seconds, and the maximum temperature ($T_{max}$) in the reactor was recorded as 102° C.

The mixture in the reactor was held at 95° C. under agitation for 180 minutes before passing the contents over a 100 mesh screen followed by filtration through No. 4 Whatman filter paper to separate the white liquor from the lime mud. The lime mud filter cake was washed with tap water until the conductivity of the effluent stream was measured as <1 mS. The ISO ($R_{457}$) dry brightness of the washed cake was 85.8, CIE b* was 0.91 and BET Specific Surface Area (SSA) was 4.1 $m^2/g$.

Example 2

This Example was carried out according to the process of the current invention. To a 4-liter SS reactor were added 1850 ml of the filtered kraft green liquor of Example 1. The contents of the reactor were then heated to 95° C. and held at that temperature by means of a circulating bath containing a 1:1 mixture of ethylene glycol and water. Agitation was accomplished by means of an impeller rotating at 1000 rpm.

To a 1-liter SS beaker containing 500 g of water at an initial temperature of 76° C. were added 100 g of the granular lime of Example 1. Slaking was carried out for 15 minutes under agitation by means of an impeller rotating at 1000 rpm. $T_{max}$ was recorded as 100° C. after about 1 minute.

The contents of the SS beaker were then poured into the SS reactor over about 1 minute at which time the temperature in the reactor dropped to about 92° C. before rising to 95° C. over about 5 minutes. The contents of the reactor were then agitated at temperature for 180 minutes before passing the contents over a 100 mesh screen followed by filtration through No. 4 Whatman filter paper to separate the white liquor from the lime mud. The lime mud filter cake was washed with tap water until the conductivity of the effluent stream was measured as <1 mS. The ISO ($R_{457}$) dry brightness of the washed cake was 91.8, CIE b* was 1.13 and BET SSA was 4.3 $m^2/g$.

Example 3

This is another Example carried out according to the process of the current invention.

To a 4-liter SS reactor were added 1850 ml of kraft green liquor filtered through No. 4 Watman filter paper and comprised of, as dissolved species, 12.54 wt. % sodium carbonate ($Na_2CO_3$), 2.36 wt. % sodium sulfide ($Na_2S$) and 1.59 wt. % sodium hydroxide (NaOH). The contents of the reactor were then heated to 95° C. and held at that temperature by means of a circulating bath containing a 1:1 mixture of ethylene glycol and water. Agitation was accomplished by means of an impeller rotating at 1000 rpm.

To a 1-liter SS beaker containing 500 g of kraft mill white liquor comprised of, as dissolved species, 8.04 wt. % sodium hydroxide (NaOH), 1.93 wt. % sodium carbonate ($Na_2CO_3$) and 1.89 wt. % sodium sulfide ($Na_2S$), and having a specific gravity of 1.15 at an initial temperature of 77° C. were added 100 g of the granular lime of Example 1. Slaking was carried out for 15 minutes under agitation by means of an impeller rotating at 1000 rpm. $T_{max}$ was recorded as 104° C. after about 2 minutes.

The contents of the SS beaker were then poured into the SS reactor over about 1 minute at which time the temperature in the reactor dropped to about 92° C. before rising to 96° C. over about 5 minutes. The contents of the reactor were then agitated at temperature for 180 minutes before passing the contents over a 100 mesh screen followed by filtration through No. 4 Whatman filter paper to separate the white liquor from the lime mud. The lime mud filter cake was washed with tap water until the conductivity of the effluent stream was measured as <1 mS. The ISO ($R_{457}$) dry brightness of the washed cake was 92.3, CIE b* was 1.31 and BET SSA was 3.1 $m^2/g$ Example 4

This is another Example carried out according to the process of the current invention.

To a 4-liter SS reactor were added 500 g of the kraft white liquor of Example 3 which were heated to 95° C. and held at that temperature by means of a circulating bath containing a 1:1 mixture of ethylene glycol and water. Agitation was accomplished by means of an impeller rotating at 1000 rpm.

To a glass 4-liter reactor were added 2238 g of the green liquor of Example 1 which were heated to 75° C. using an electric heating mantle.

To a glass 2-liter reactor were added 500 g of the kraft white liquor of Example 3 which were heated to 70° C. using an electric heating mantle. The heating mantle was turned off and 100 g of the lime from Example 1 were added to the heated white liquor under agitation provided by an impeller rotating at 700 rpm. Tmax was 98° C. after about 3 minutes. After about 20 minutes, the electric mantle was again turned on. At this time, alkaline slurry of lime in white liquor had cooled to about 85° C.

The alkaline slurry of lime in white liquor was pumped at a rate of 17.7 ml/min into the 4-liter SS reactor containing the heated white liquor. Simultaneously, green liquor was pumped at a rate of 62.0 ml/min into the 4-liter SS reactor. As the slurry and green liquor were added, agitation was accomplished by means of an impeller rotating at 1000 rpm. Addition of the slurry and green liquor was complete after about 27 minutes during which time the temperature of the reactor contents rose from about 92 to about 94° C. Mixing was continued for about 20 minutes before passing the contents of the SS reactor over a 100 mesh screen followed by filtration through No. 4 Whatman filter paper to separate the white liquor from the lime mud. The lime mud filter cake was washed with tap water until the conductivity of the effluent stream was measured as <1 mS. The ISO ($R_{457}$) dry brightness of the washed cake was 90.9, CIE b* was 1.22 and BET SSA was 1.2 $m^2/g$.

As can be seen in the above Examples 2, 3 and 4 made according to the present invention, the ISO($R_{457}$) dry brightness of the washed lime mud filter cake or particulate calcium carbonate was above 90 in each case. Further in each of these three above-mentioned examples, a CIE b* value was achieved for the precipitated calcium carbonate which is acceptable for papermaking.

Examples 5-10

These Examples were carried out according to conventional means and not according to the method of the current invention. A series of reactions were carried out, each reaction done according to the same process that is described below. The results are recorded in Table 1.

To a 4-liter reactor were added 1850 ml of kraft green liquor filtered through No. 4 Whatman filter paper and comprised of, as dissolved species, 12.54 wt. % sodium carbonate ($Na_2CO_3$), 3.36 wt. % sodium sulfide ($Na_2S$) and 1.59 wt. % sodium hydroxide (NaOH), and having a specific gravity of 1.21. The contents of the reactor were then heated to 95° C. and held at that temperature by means of a circulating bath containing a 1:1 mixture of ethylene glycol and water. Agitation was accomplished by means of an impeller rotating at 1000 rpm.

100 g of granular lime having an active CaO content of about 95% was added to the reactor over about 15 seconds.

The mixture in the reactor was held at 95° C. under agitation for 180 minutes before passing the contents over a 100 mesh screen followed by filtration through No. 4 Whatman filter paper to separate the white liquor from the lime mud. The lime mud filter cake was washed with tap water until the conductivity of the effluent stream was measured as <1 mS. The particle size distribution of the lime mud particles was measured using a Micromeritics Sedigraph 5100. The Hunter brightness and color of the washed, wet cake were recorded as was the ISO ($R_{457}$) dry brightness and BET Specific Surface Area (SSA).

TABLE 1

| | WASHED SLURRY TESTING | | | | | OVEN DRY TESTING | | |
|---|---|---|---|---|---|---|---|---|
| | $d_{90}$, μm | $d_{50}$, μm | Hunter Rd | Hunter b | Filtration rate (sec) | SSA, $m^2/g$ | ISO $R_{457}$ | CIE b* |
| Example 5 | 16.7 | 6.0 | 27.4 | −1.3 | 29 | 2.9 | 70.8 | 2.4 |
| Example 6 | 12.7 | 4.3 | 34.9 | −1.0 | 35 | 4.1 | 77.6 | 1.7 |
| Example 7 | 13.3 | 4.7 | 38.2 | −1.2 | 35 | 3.7 | 76.7 | 1.3 |
| Example 8 | 13.6 | 4.8 | 33.7 | −1.3 | 30 | 4.0 | 74.6 | 1.9 |
| Example 9 | 12.3 | 4.4 | 38.9 | −1.3 | 31 | 4.2 | 79.7 | 1.2 |
| Example 10 | 14.4 | 4.7 | 36.0 | −1.0 | 25 | 5.7 | 77.3 | 1.2 |

Examples 11-15

These Examples were carried out by the method of the current invention. A series of reactions were carried out, each reaction done according to the conditions described in Example 3, but using a green liquor containing the same dissolved species in the same concentrations as used in Examples 5-10. The results are recorded in Table 2.

TABLE 2

| | WASHED SLURRY TESTING | | | | | OVEN DRY TESTING | | |
|---|---|---|---|---|---|---|---|---|
| | $d_{90}$, μm | $d_{50}$, μm | Hunter Rd | Hunter b | Filtration rate (sec) | SSA, $m^2/g$ | ISO $R_{457}$ | CIE b* |
| Example 11 | 4.5 | 2.9 | 40.7 | −0.6 | 32 | 3.1 | 88.0 | 2.6 |
| Example 12 | 4.7 | 3.1 | 37.4 | −0.4 | 23 | 3.1 | 87.1 | 2.7 |
| Example 13 | 5.3 | 3.4 | 33.9 | −0.5 | 22 | 3.4 | 81.0 | 1.9 |
| Example 14 | 4.0 | 2.5 | 58.8 | 0.1 | 29 | 3.9 | 92.3 | 1.4 |
| Example 15 | 4.8 | 3.1 | 49.2 | −0.1 | 30 | 3.3 | 89.8 | 1.5 |

Figure 12:
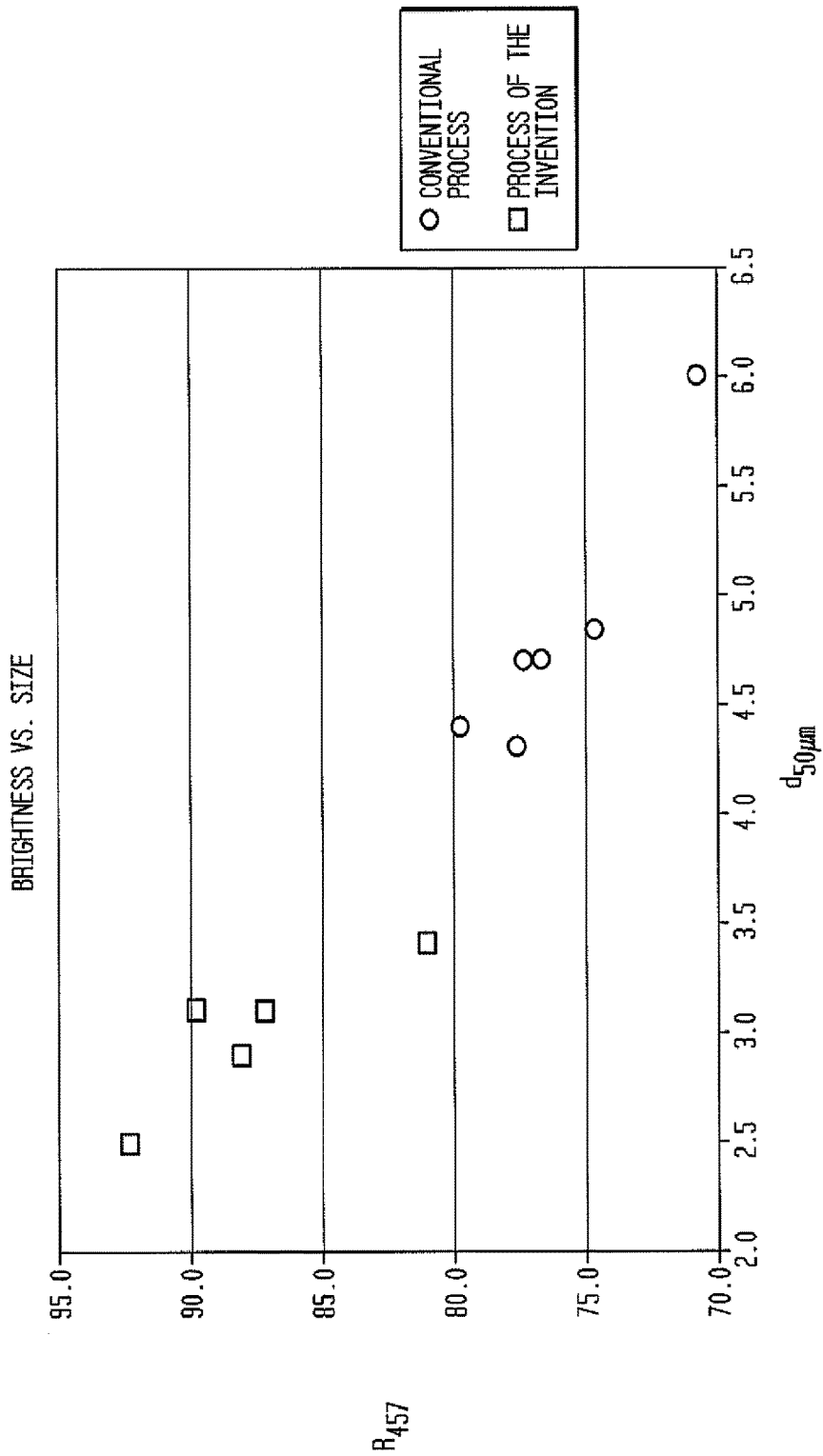
FIG. 12 is a graph showing the correlation between brightness and size of particulate calcium carbonate of the present invention and from a typical kraft pulp mill.

The data contained in Tables 1 and 2 are compared in FIGS. 12 and 13, and serve to illustrate the differences among lime mud particles produced via conventional means and lime mud particles produced according to the method of the current invention.

In FIG. 12 it is evident that lime mud particles arising from the method of the current invention exhibit sizes about one-half that of particles arising from conventional causticization. This in turn gives rise to higher brightness. It is both counterintuitive and surprising to observe the data shown in FIG. 13.

The filtration data shown in FIG. 13 was obtained from a laboratory filtration test designed to standardize and measure the time required to separate small amounts of lime mud from the free liquid in which the particles of lime mud are suspended. The test is done as follows:

1. A 5.5 cm Buchner funnel is connected to a sidearm flask under water aspiration and fitted with w/Whatman No. 5 filter paper.
2. 50 g of 20±1% solids of slurry that has first been water-washed to ≤1 mS conductance in the effluent is well-shaken and instantly poured into the Buchner funnel.
3. The time (in seconds) until there is no visible liquid on top of the cake is recorded.

FIG. 13 clearly shows that although the particles produced by the method of the current invention are smaller than those produced via conventional means, they also are more easily separated from the liquid in which they are suspended, as evidenced by filtration times that are equal or lower than for particles produced by conventional processes.

Accordingly, by the method of the present invention a particulate calcium carbonate suitable for paper can be made. Paper can be made comprising the particulate calcium carbonate made by the method of the present invention.

Paper can be made comprising pulp made by chemical pulping such as the Kraft process and also comprising particulate calcium carbonate made by the method of the present invention.

Accordingly, it is understood that the above description of the present invention is susceptible to considerable modifications, changes and adaptations by those skilled in the art, and that such modifications, changes and adaptations are intended to be considered within the scope of the present invention.

We claim:

1. A method for obtaining particulate calcium carbonate product comprising:
   providing green liquor from a kraft pulping process;
   adding calcium oxide to a fluid to form a reaction product of calcium oxide and the fluid;
   agitating the reaction product of calcium oxide and the fluid;
   after agitation, optionally adding white liquor from a kraft pulping process to the reaction product of calcium oxide and the fluid;
   after the agitation and the optional addition of white liquor, reacting the reaction product of calcium oxide and the fluid, optionally comprising added white liquor, with the green liquor to complete a causticization reaction which produces white liquor and unwashed lime mud comprising calcium carbonate;
   separating the unwashed lime mud from the white liquor;
   washing the unwashed lime mud with water to provide washed lime mud and weak wash; and
   reacting the washed lime mud with carbon dioxide vapor;
   wherein the fluid to which the calcium oxide is added is weak wash or a combination of water and weak wash;
   wherein the weak wash is weak wash from washing the lime mud with water; and
   wherein a portion of the white liquor from the causticization reaction is the white liquor which is optionally added after the agitation.

2. The method of claim 1, wherein after agitation, white liquor is added, such that a portion of the white liquor from the causticization reaction is the white liquor added after the agitation.

3. The method of claim 1, wherein separating the lime mud from the white liquor comprises use of a Whatman no. 4 filter.

4. The method of claim 1, wherein the agitation occurs for at least 15 minutes.

5. A method for obtaining particulate calcium carbonate product comprising:
   providing green liquor from a kraft pulping process;
   slaking calcium oxide in a fluid comprising water to form a milk of lime;
   reacting the milk of lime with the green liquor to complete a causticization reaction which produces white liquor and unwashed lime mud comprising calcium carbonate; and
   separating the lime mud from the white liquor, washing the lime mud with water to provide washed lime mud, and reacting the washed lime mud with carbon dioxide vapor;
   wherein the fluid in which the calcium oxide is slaked is weak wash or a combination of water and weak wash, the weak wash being weak wash from washing lime mud with water.

6. The method of claim 5, in which slaked calcium oxide is combined with white liquor from a kraft pulping process and the combination is reacted with the green liquor from a kraft pulping process, wherein a portion of the white liquor from the causticization reaction is the white liquor which is combined with the slaked calcium oxide.

7. The method of claim 5, comprising combining the slaked calcium oxide with white liquor from a kraft pulping process; reacting the combination of slaked calcium oxide and white liquor with the green liquor from a kraft pulping process.

* * * * *